Patented June 10, 1952

2,600,031

UNITED STATES PATENT OFFICE 2,600,031

CELLULOSE ESTER MANUFACTURE

John Cunningham Thomas, Wilmington, Del., assignor to E. I. du Pont de Nemours & Company, Wilmington, Del., a corporation of Delaware No Drawing. Application February 4, 1949, Serial No. 74,698

6 Claims. (Cl. 260—229)

This invention relates to cellulosic material and more particularly to the modification of cellulosic material and to the provision of new cellulosic compositions having greatly increased chemical reactivities.

Cellulosic materials have varying degrees of reactivity to chemical reagents, e. g. to esterifying agents, depending on various factors such as the source of the cellulose and the particular isolating and purifying methods. Also, cellulosic materials are often subjected to pretreatments of various types to increase chemical reactivity and to improve the quality of the products obtained. Many pretreating agents, including organic and inorganic acids and their neutral, acidic or basic salts, have been proposed for modifying the reactivity of cellulosic material. Some of these pretreatments, especially those involving pretreatment with organic acids, have achieved commercial success. Although these known pretreatments produce some increase in the reactivity of the cellulose to esterification, they do not produce a truly rapid esterification rate. Even with the best of these previously known treatments undesirably long esterification times are required. Because of the large investment in equipment required to produce large quantities of a cellulose derivative, such long times of reaction are economically unattractive.

Accordingly, it is an object of this invention to provide cellulosic compositions which are highly reactive to such chemical reactions as esterification. A further object is the provision of a method for the preparation of new reactive compositions. A still further object is the provision of a process for the rapid chemical modification of cellulose. Other objects appear hereinafter.

Cellulosic materials having greatly increased reactivity to esterification and other reactions are prepared by this invention by impregnating the cellulosic material wtih ammonium thiosulfate from aqueous solutions. The resultant impregnated cellulose is then chemically modified by treatment with a derivative forming agent which is active therewith, such as an aldehyde or an aliphatic carboxylic acid anhydride. These react with reactive cellulose through its hydroxyl groups to form acetals or esters. For example, cellulose so impregnated is highly reactive, being, for example, substantially completely esterified in an extremely short time with aliphatic acid anhydrides.

The invention is illustrated by the following examples in which the proportions of ingredients are expressed in parts by weight unless otherwise noted.

Example I

Ten and four-tenths parts of cotton linters containing 4% moisture is impregnated with 40% by weight of ammonium thiosulfate by soaking in 150 parts of an aqueous 40% ammonium thiosulfate solution for 30 minutes at room temperature, centrifuging to a wet weight of 20 parts, and drying in a vacuum desiccator over anhydrous calcium chloride. The dried cellulose is placed in 300 parts of acetic anhydride which has been heated to the boiling point in a reaction vessel fitted with a reflux condenser. The mixture is heated with shaking. Almost immediately ebullition starts and a yellow color forms in the liquid. After about 35 seconds the cellulose fibers begin to swell, and after one minute the cellulose is disintegrating and there is very vigorous ebullition. In about 1 minute and 20 seconds after the addition of the cellulose to the reaction mixture the mixture is a smooth, cloudy, light brown solution containing many undissolved short fibers, and ebullition has stopped. After a total reaction time of about two minutes, the solution is a little less cloudy. It is immediately poured, rapidly and with vigorous agitation, into about 2000 parts of an aqueous 10% acetic acid solution at 65° C. The resulting white flocculent precipitate of cellulose acetate is stirred for 15 minutes, filtered with suction and washed on the filter with water at 65° C. The wet product is stirred in 2000 parts of fresh water at 65° C., filtered and washed again. After repeating this washing procedure twice the cellulose acetate is partially dried in air at room temperature and drying is completed in an oven at 65° C. The product is a flocculent cellulose triacetate with a very slight yellow color, and it amounts to 18 parts by weight. The product contains 1.76% combined sulfur and has a D. P. of 420. The D. P. (degree of polymerization) is calculated by Staudinger's equation from the specific viscosity of a dilute solution of the cellulose acetate in glacial acetic acid; see pages 927–929 of "High Polymers, Vol. V, Cellulose Derivatives," Interscience Publishers Inc., 1943; edited by Ott. The product is soluble in hot glacial acetic acid, and it does not precipitate when the solution is cooled to room temperature. It is readily soluble in methylene chloride but is insoluble in acetone.

When cotton linters impregnated with 40% ammonium thiosulfate are acetylated by the procedure of the above example for a total acetylation time of 5 minutes, the reaction mixture contains fewer undissolved fibers, and the resulting cellulose triacetate has a D. P. of 430 and 2.17% combined sulfur.

*Example II*

Ten parts of cotton linters impregnated with 20% of ammonium thiosulfate is prepared by immersing 10.4 parts of cotton linters containing 4% moisture in an excess of 20% aqueous ammonium thiosulfate solution, centrifuging and drying by the method used in Example I. The resultant dry impregnated cellulose is acetylated by the procedure of the preceding example. The cellulose triacetate isolated after a total reaction time of 3 minutes at reflux temperature (138° C.) has a D. P. of 385 and a combined sulfur content of 0.74%.

The cellulose acetate obtained after 8 minutes acetylation of cotton linters impregnated with 20% of their weight of ammonium thiosulfate by the procedure of Example II has fewer undissolved fibers than the product of that example, but it has a D. P. of 210 and a combined sulfur content of 0.90%.

*Example III*

Ten and four-tenths parts of cotton linters containing 4% moisture is impregnated with 40% by weight of ammonium thiosulfate and dried by the procedure described in Example I. The dried impregnated linters are added to 300 parts of acetic anhydride at room temperature in a reaction vessel fitted with a mechanical stirrer and a reflux condenser, and the mixture is heated on a steam bath with stirring. In about 5 minutes the temperature of the reaction mixture reaches about 95° C. In the period from 6 to 18 minutes after heating and stirring are started the liquid turns slightly yellow, the linters swell, then begin to disintegrate and finally start going into solution. The grainy brown solution containing a few undissolved white lumps which forms in about 20 minutes becomes smooth, viscous, reddish brown and contains fewer lumps at the end of 30 minutes. At this time the solution is removed from the steam bath and filtered through cotton, and after 34 minutes total reaction time the solution is poured into 10% aqueous acetic acid. The product is precipitated and worked up by the procedure described in Example I. The resulting cellulose triacetate contains 1.33% combined sulfur, has a D. P. of 630, and is soluble in acetic acid and methylene dichloride. The solutions of this product do not contain any short undissolved fibers, as do the solutions of the cellulose triacetate of Example I.

In a prefered method for carrying out this invention, fibrous, native cellulose, e. g., cotton linters or wood pulp, is immersed in an aqueous solution containing at least 15% by weight of ammonium thiosulfate. The maximum concentration of the impregnating solution is limited only by the solubility of ammonium thiosulfate in water. Aqueous solutions of from 20–40% concentration give very good results. The impregnation is conveniently done by immersing the cellulose in an excess of the aqueous solution of ammonium thiosulfate for about ½ hour at room temperature. Longer times can be used if desired, but usually ½ hour is sufficient to obtain uniform impregnation. The excess liquid is removed from the impregnated cellulose by conventional means, such as by filtration under pressure or under vacuum, or by centrifuging. The last method is especially preferred because of the reproducibility of the results obtained. The amount of solution left in the cellulose will of course depend on the amount of ammonium thiosulfate desired in the cellulose, on the concentration of this salt in the impregnating solution, and on the particular method of treatment being employed. Since use of amounts considerably less than 15% do not give the rapid reactions produced using higher concentrations, the impregnated cellulose should contain at least 15% by weight of ammonium thiosulfate, and for maximum reactivity it should contain from 20–40%. While higher amounts than 40% may be used, for practical purposes there is no advantage in using amounts greater than 40%. When impregnating solutions of 20% to 40% concentration are used it is convenient to centrifuge the cellulose to a wet weight double that of the dry cellulose. After centrifuging or pressing to the desired wet weight, the impregnated cellulose is usually, but not necessarily, dried by exposing it to the action of a desiccant at atmospheric or decreased pressure, or by exposing it to current of air at ordinary or moderately elevated, e. g., 50°–75° C., temperature. The resulting impregnated cellulose is highly reactive.

In a preferred esterification procedure the dry cellulose impregnated with 20% to 40% of its weight of ammonium thiosulfate is placed in a large excess of aliphatic carboxylic acid anhydride, e.g., a quantity of acetic anhydride amounting to 10 to 30 times the weight of the cellulose, maintained at its boiling point in a reaction vessel fitted with a reflux condenser. Ebullition of the reaction mixture begins almost immediately; in a few seconds the cellulose becomes highly swollen and then begins to go into solution and the reaction mixture refluxes vigorously. In from one to ten minutes after the cellulose has been introduced into the acid anhydride the cellulose is substantially completely esterified and is in solution in the reaction mixture. The exact time required for completion of the esterification depends on the particular concentration of ammonium thiosulfate in the cellulose and on the particular acid anhydride being employed. The resulting solution is poured rapidly with vigorous agitation into about 6.5 times its weight of dilute aqueous acetic acid, e.g., 10% acetic acid, at a temperature of about 65° C. The cellulose ester precipitates in the form of fluffy white flocks which, after being stirred for several minutes in the precipitating bath, are filtered out, washed acid-free and dried.

In another esterification procedure the dry impregnated cellulose, preferably containing from 20% to 40% of its weight of ammonium thiosulfate, is placed in a large excess of aliphatic carboxylic acid anhydride, e. g., 30 parts of acetic anhydride, at room temperature in a reaction vessel and the mixture is then heated during a period of 5 to 10 minutes to a temperature of 90–95° C. In this embodiment a longer time is required for completion of esterification than when boiling anhydride is employed. The exact time required to produce a substantially completely esterified cellulose depends on the particular concentration of the ammonium thiosulfate in the cellulose and on the particular anhydride being used. Reaction times ranging from about ½ to 3 hours are suitable, the shorter times being sufficient when the higher concentrations of ammonium thiosulfate and lower anhydrides are employed.

In still another esterification procedure, which is preferred for the preparation of cellulose esters in fibrous form, the impregnated cellulose is placed in a refluxing mixture of the aliphatic carboxylic acid anhydride and a non-solvent for the cellulose ester being produced, such as, for example, xylene. In the preparation of a fibrous cellulose acetate a quantity of acetic anhydride amounting to about 4 times the weight of the cellulose and a quantity of xylene amounting to about 22.5 times the weight of the cellulose is satisfactory. The reaction mixture is maintained at reflux temperature until the cellulose is substantially completely acetylated, about 10 to 20 minutes being required with the higher concentrations of ammonium thiosulfate and longer times with the lower concentrations. At the completion of the reaction, which can be determined by testing the solubility of small samples of the fibrous cellulose acetate in glacial acetic acid, the fibrous product is filtered from excess reaction mixture, washed acid-free, and dried by conventional methods.

The cellulosic material used in the practice of this invention can be any of the common types of cellulose such as, for example, cotton linters, wood pulp and regenerated cellulose. Of these, fibrous native cellulose, e. g., cotton linters and wood pulp, is especially suitable. Partially substituted organic cellulose derivatives such as, for example, methylcellulose, ethylcellulose, carboxymethylcellulose, hydroxyethylcellulose, cellulose acetate and the like, which swell adequately during impregnation through having, in general, at least two free hydroxyl groups for each 6-carbon unit of the cellulose nucleus, can also be employed in the practice of this invention.

The impregnated celluloses of this invention are rapidly esterified with lower aliphatic acid anhydrides at temperatures above 90° C. Examples of such anhydrides which are particularly useful include acetic and propionic anhydrides. For homogeneous esterification a quantity of anhydride amounting to about 30 times the weight of the cellulose is very suitable, the excess anhydride serving as a solvent for the cellulose acetate formed in the reaction. However, smaller amounts, e. g., ten or twenty times the weight of the cellulose, can be used if desired. Smaller amounts of anhydride can also be used when inert solvents, such as dioxane, are employed. In the latter case a quantity of anhydride amounting to only eight times the weight of the cellulose is suitable. In the heterogeneous method of esterification, in which the cellulose esters formed retain the fibrous structure of the original cellulose, a quantity of anhydride amounting to at least two times the weight of the cellulose is employed, together with sufficient hydrocarbon diluents, for example, toluene, xylene, or aliphatic hydrocarbons having boiling points above 90° C., to prevent the cellulose esters from dissolving in the reaction mixture. In the case of acetylation in the presence of xylene a quantity of acetic anhydride amounting to four times and a quantity of xylene amounting to 20–25 times the weight of the cellulose are very satisfactory.

The time required for substantially fully esterifying or otherwise modifying the pretreated cellulose of this invention depends on the particular anhydrides, or other reactants, the temperature of the esterifying or other reaction mixture, and on the concentration of ammonium thiosulfate in the cellulose. For example, using cellulose impregnated with 40% ammonium thiosulfate in a homogeneous acetylation system, esterification is completed in from 1 to 10 minutes at 140° C., and in about 30 to 40 minutes at 90° C. With higher anhydrides such as propionic and butyric anhydride, esterification periods are longer than in the case of acetylation at the same temperature. Also, when a heterogeneous esterification system involving a lower ratio of anhydride to cellulose is employed the reaction times are slightly longer for the same concentration of ammonium thiosulfate in the cellulose, the same acid anhydride and the same reaction temperature.

The coagulation of the cellulose ester formed in homogeneous systems is preferably carried out by pouring the mixture into a large excess of a dilute aqueous aliphatic acid solution at elevated temperature, for example, at 50° to 75° C. This type of precipitation gives a flocculent porous product. If a harder granular product is desired, the precipitation can be carried out in dilute aqueous aliphatic acid solutions at room temperature. A 10% aqueous acetic acid solution is satisfactory for this purpose; however, higher concentrations of acetic acid, e. g., up to 15% or 20% can be used for precipitating cellulose esters of the higher degrees of polymerization. If desired, the cellulose ester can be coagulated in non-aqueous liquids, such as ethers, and aromatic or aliphatic hydrocarbons, which are non-solvents for the cellulose esters.

The reactivity of cellulose impregnated with ammonium thiosulfate alone is greatly unexpected. Many ammonium salts of various organic and inorganic acids have been disclosed in the prior art as pretreating agents or impregnants for cellulose to be used in esterification, or as catalysts in cellulose esterification mixtures, but these proposed salts, used either as impregnants or as catalysts, do not give the results obtained in the process of this invention. Furthermore, while mixtures of ammonium or amine salts of inorganic sulfoxy acids in combination with ammonium salts or amides of carboxylic acids in certain proportions impregnated in cellulose, as described in my copending application Serial No. 16,621, filed March 23, 1948, now Patent No. 2,585,516, issued February 12, 1952, also greatly increase the rate of esterification of cellulose, ammonium thiosulfate is unique in being the only sulfoxy acid salt known which is capable of providing this high chemical reactivity and of providing cellulose esters of high degrees of polymerization, i. e., esters having a D. P. above 100, when used alone in the absence of an ammonium salt or amide of a carboxylic acid. For example, cotton linters impregnated with about 38% of their dry weight of urea in combination with about 2% of ammonium sulfate, ammonium sulfite, or ammonium thiosulfate are shown in the above-mentioned application to react rapidly with acetic anhydride at elevated temperatures to give cellulose triacetates having degrees of polymerization of the order of 500–600. On the other hand, the same type of linters impregnated with 40% of ammonium sulfate or ammonium sulfite alone react more slowly, 15 to 30 minutes being required, in contrast to only 1 to 7 minutes required for cellulose impregnated with mixtures of these salts with urea. No surge, or short period of vigorous reaction, is observed. The resulting cellulose triacetates have degrees of polymerization of 50 or less. Cellulose impregnated with ammonium thiosulfate alone is esterified with the same surge, or short period of vigorous reaction, on immersion in boiling acetic anhydride that is characteristic of cellulose impregnated with a mixture of ammonium salts of sulfoxy acids and ammonium salts or amides of carboxylic acids.

Particular emphasis has been placed on the description of this invention with respect to esterification reactions. This has been done for simplification, since a standard was required in order to determine the relative effectiveness of the various concentrations of ammonium thiosulfate. Similar comparisons could be given for other reactions. For example, in addition to being useful for the preparation of cellulose esters, the impregnated celluloses of this invention are also useful for the preparation of cellulose acetals by reaction with aldehydes such as formaldehyde. The cellulose esters produced from the impregnated celluloses of this invention are useful in the manufacture of films, fibers, coating compositions, molding compositions and the like, and for partial deacetylation to cellulose esters having other solubility characteristics.

Any departure from the procedure described herein which conforms to the principles of the invention is intended to be included within the scope of the claims below.

I claim:

1. A process for the preparation of cellulose esters which comprises impregnating cellulosic materials with at least 15% based on the cellulose material of ammonium thiosulfate and esterifying the resultant impregnated cellulose with an aliphatic acid anhydride.

2. A process in accordance with claim 1 wherein the concentration of ammonium thiosulfate is 20% to 40% based on the cellulose.

3. A process for the preparation of cellulose esters which comprises esterifying cellulose impregnated with at least 15% based on the cellulose material of ammonium thiosulfate with an aliphatic acid anhydride.

4. A process for the preparation of cellulose esters which comprises impregnating cellulose with at least 15%, based on the cellulose, of ammonium thiosulfate and esterifying the resultant impregnated cellulose with acetic anhydride.

5. A process in accordance with claim 4 in which the amount of ammonium thiosulfate is 40%.

6. A process for the preparation of cellulose esters which comprises impregnating cellulose with at least 15%, based on the cellulose, of ammonium thiosulfate and esterifying the resultant impregnated cellulose with propionic anhydride.

JOHN CUNNINGHAM THOMAS.

REFERENCES CITED

The following references are of record in the file of this patent:

UNITED STATES PATENTS

| Number | Name | Date |
|---|---|---|
| 2,172,447 | Marschall | Sept. 12, 1939 |
| 2,418,938 | Izard | Apr. 15, 1947 |
| 2,418,939 | Izard | Apr. 15, 1947 |
| 2,503,443 | Knapp | Apr. 11, 1950 |